United States Patent [19]
Cleveland et al.

[11] Patent Number: 5,324,359
[45] Date of Patent: Jun. 28, 1994

[54] MATERIAL DEPOSITION DEVICE

[75] Inventors: Wade J. Cleveland, Newport Beach; Norman Hays, Orange, both of Calif.

[73] Assignee: Nouvas Manufacturing Technology Co., Irvine, Calif.

[21] Appl. No.: 841,581

[22] Filed: Feb. 25, 1992

[51] Int. Cl.[5] .................. B05B 12/06; B05C 5/00
[52] U.S. Cl. .................. 118/688; 118/696; 118/697; 118/698; 118/699; 118/712; 118/620; 118/628; 118/630; 118/631; 118/323; 118/325
[58] Field of Search .............. 118/688, 696, 697, 699, 118/703, 712, 620, 621, 628, 630, 631, 325, 323, 680, 682, 684, 698

[56] References Cited

U.S. PATENT DOCUMENTS

| | | | |
|---|---|---|---|
| 3,991,705 | 11/1976 | Adler | 118/696 |
| 4,156,398 | 5/1979 | McDaniel | 118/699 |
| 4,421,800 | 12/1983 | Schoenberg et al. | 118/680 |
| 4,530,862 | 7/1985 | Kerzel | 118/699 |
| 4,716,058 | 12/1987 | Morin | 118/688 |
| 4,762,578 | 8/1988 | Burgin, Jr. et al. | 118/712 |
| 4,988,015 | 1/1991 | Price | 118/684 |
| 5,065,695 | 11/1991 | Baron et al. | 118/688 |
| 5,074,443 | 12/1991 | Fujii et al. | 118/684 |
| 5,134,961 | 8/1992 | Giles et al. | 118/684 |

FOREIGN PATENT DOCUMENTS

| | | | |
|---|---|---|---|
| 59-95149 | 6/1984 | Japan | 118/621 |
| 64-30236 | 2/1989 | Japan | 118/699 |
| 2-284042 | 11/1990 | Japan | 118/688 |
| WO87/02913 | 5/1987 | PCT Int'l Appl. | 118/684 |

OTHER PUBLICATIONS

Webster's II New Riverside Dictionary, The Riverside Publishing Company 1984.

Primary Examiner—W. Gary Jones
Assistant Examiner—Todd J. Burns

[57] ABSTRACT

A material deposition device places droplets on a substrate. A conveyer on a chassis moves the substrate relative to a plane so a deposition means on the chassis may release material onto the substrate moved by the conveyer. A movable support means attached between the chassis and the deposition means locates it with respect to the conveyer allowing relative motion therebetween. A supply of material connected to the deposition means sends pressurized material thereto. A control causes relative motion between the conveyer and the movable support means varying the position of the deposition means relative to the substrate. The control has a memory operatively connected to timely activate the deposition means. The deposition means has a body communicating with the supply of material and a valve means responsive to the control selectively delivers droplets to the substrate. The body has an inlet communicating with the supply for the valve means and an outlet shaped forms droplets for delivery toward the substrate. An electrostatic means establishes a fixed or varying force field to reposition or recycle the material delivered. An interchangeable outlet orifice adjusts the size of droplets delivered. A vision system examines droplets monitoring quality and a feedback signal to vary the material in each droplet. The radiation station doses droplets.

27 Claims, 5 Drawing Sheets

MATERIAL DEPOSITION DEVICE

FIELD OF THE INVENTION

This invention relates to equipment that applies in a precise location an accurate amount of material. More specifically, a device deposits a preset volume of chemicals or bioreagents to test strips, immunoassay tests, test cells, detection assays .or other substrates and the device is able to repeatedly deposit material thus enabling the manufacture of identically treated substrates.

BACKGROUND OF THE DISCLOSURE

Described herein are a device which constitutes the equipment, the method of usage for that equipment and the products produced by the device and method. The disclosure herein will not be found in the literature or has not previously been practiced in the field. The literature is of interest for its teachings of the knowledge of skilled artisans at the time of this invention and of the products produced thereby. The claimed invention is a movable support for carrying the material deposition means, a control for moving and activating the deposition means and substrate movable relative to the deposition means and for receiving the material.

Test cells have been manufactured and sold for many home and doctor diagnostic purposes and particularly, pregnancy, strep, AIDS, rubella, influenza and similar conditions. Early detection of the existance of such a condition is of great importance and a simple diagnostic test cell or immunoassay is required. Typically such cells or immunoassay are multi layer structures having several carefully constructed component levels. Each level or layer may have one or more materials such as, bioreagents, target analytes, fluorescent dyes or other responsive ingredients applied to a substrate of a substrate. The arrangement of the layers facilitates a specific biological, optochemical or chemical reaction.

Traditional laboratory testing of specimens requires time and precise handling of the relatively small test specimen. The dangers of time delay to the reagents, loss and improper handling procedures represented serious concerns resulting in increased cost and inaccurate results. In addition, concern for liability, injury and malpractice claims necessitate a more accurate, reliable and convenient technology.

Diagnostic tests that could be performed immediately on almost minute specimens eliminate many of the difficulties and inaccuracies of remote laboratory testing. Diagnostic test assays, cells or strips have to be precisely prepared and made at a relatively low cost to enable wide and successful usage. Confidence in the ability to correctly test with a simple product requires that the test analytes, bioreagent dyes and reactive materials be applied with great precision. Application amount and location are important factors which permit expensive ingredients to be used without concern for waste or the reliability and repeatability of the test product manufactured.

Test cells often rely on color change or the appearance of a specific pattern to indicate a positive or negative result. Whether color or pattern is the indicator, the reaction sought must be dependant primarily on the specimen to be identified. Ambient conditions at the time of manufacture are controlled by the maker of the test cell and are regulated by the Food and Drug Administration. Protective packaging maintains the as manufactured condition of the test assay, cell or indicator.

U.S. Pat. No. 4,912,034 has an apparatus for use in an immunoassay to detect a target analyte in a liquid sample including a porous reactive filter with upper and lower surfaces bound with an antibody specific for a target antigen. Methods of binding include competition for labeled analyte, reaction of a second binding pair member labeled with the bound analyte or detection of an intrinsic measurable analyte property. Although such tests are easy to use and accurate no equipment to accurately and precisely place the reactive material on the filter is disclosed.

U.S. Pat. No. 4,916,056 has a solid phase binding assay to find the amount of analyte in a sample, particularly antigens, antibodies or other ligand or DNA segments. Herein the analyte binding areas capable of simultaneously being contacted by the sample and bioreagent provide readable results. While accurate placement of the bioreagent and/or analyte is important to repeatability, no disclosure of any mechanism to carefully deposit either appears in this patent.

European Patent Application 0 066 648 is a multi layer element analysis for the concentration of specific components using competitive immune reaction including a detection layer and a reaction layer which require careful preparation to be sensitive and reproducible. Test for biochemical changes due to application of substances from the living body detect changes as a result of the amount or concentration of the substance to be found. Even though such a dry test is easier to use than the mixing of liquids, no means for automatically and accurately producing that test in high numbers exists.

Other test apparatus are disclosed in European patent applications 0 217 403 and 0 236 768.

SUMMARY OF THE INVENTION

A material deposition device to intermittently or continuously place varied or patterned deposits of material on a substrate is disclosed and claimed and may preferrably have a chassis to mount components of the material deposition device relative to a plane. A conveyer supported on the chassis may move the substrate in the plane. A deposition means may be carried on the chassis in position for intermittently releasing material to flow onto the substrate moving under the influence of the conveyer. A movable support means attached between the chassis and the deposition means locates the deposition means with respect to the conveyer and the movable support means permits relative motion between the deposition means and the conveyer to position the deposition means during deposit of material on the substrate.

A supply of material connected to the deposition means preferrably provides material to the deposition means. A control for intermittently or continuously causing relative motion between the conveyer and the movable support means varies the position of the deposition means relative to the substrate. The control may have a memory operatively connected to the deposition means to timely activate the deposition means.

The most preferred movable support means moves the deposition means normal to the plane causing the deposition means to define a locus set within the memory of the control; the locus specifies the relative position between the conveyer and the deposition means. The movable support means may also move the deposition means along a path above the plane.

The deposition means may include a body connected to the supply of material for communicating therewith. It is preferred that a valve means associated with the body and responsive to the control selectively release material from the body for delivery toward the substrate. The body most preferably has an inlet and an outlet. The inlet communicates with the supply of material to provide material to the valve means and the outlet is shaped for shaped delivery of the material toward the substrate. It is preferred that the control may cause the valve means to intermittently deliver droplets to the substrate but continuous flow is possible. The position of droplets relative to the substrate can be controlled by varying the pulse frequency in combination with relative motion of the deposition means and conveyer.

The control may preferrably operate the valve means to intermittently disperse through the outlet droplets in the range of one per minute to greater than one thousand per second. The valve means may include a magnetically operated ball; the ball may preferrably have a mass sufficiently low to permit dispersion in the preferred range.

The control may include timing means for generating pulses of a preset frequency and predetermined duration and the timing means connects in a circuit with the valve means for intermittent delivery of droplets of material in the preferred range. The valve means may preferrably have a magnetically actuated needle, instead of the ball, which needle responds to the circuit means to intermittently deliver droplets from the supply of material through the outlet and in the preferred range. The droplet volume may be controlled by use of the predetermined pulse width, i.e. duration. Moreover the pulses may be changed so that the volume varies from pulse to pulse if that is needed.

The outlet may have an interchangeable orifice mounted thereto for also adjusting, in addition to pulse width or duration, the size of droplets delivered so a small but significantly reactive dot of material or continuous line formed of overlapping dots of material can be deposited on the substrate. A vision system responsive to the generated pulses, e.g. by a strobe, is preferrably located on the chassis in position to examine droplets from the outlet passing thereby. The vision system is located and arranged for monitoring the droplet quality e.g. timing and size of droplets formed. Information obtained from the vision system may be used to generate a feedback signal to the control for operating the valve means to change the pulse width and therefore the volume of the dot dispensed.

An electrostatic means may be used to establish a fixed or varying force field to position the droplets leaving the outlet. The electrostatic means is most preferrably positioned on the chassis in a position to be downstream of the vision system. It is preferred that the electrostatic means is oriented to submit rejected droplets to a return connected to the supply of material to thereby recycle droplets lacking quality. The outlet may be shaped for patterned delivery of the material and under the influence the force field of the electrostatic means the patterned delivery may be further varied before deposition on the substrate.

A radiation processing station may be mounted to the chassis and arranged to irradiate droplets not deflected for application of a dosage of radiant energy to the droplets before their deposition on the substrate. The radiation dosage may consist of electrons, photons or others for inducing desired changes in the droplets to achieve beneficial results. For example, radiation may be applied to cure the droplets on the substrate.

DETAILED DESCRIPTION OF THE INVENTION

A material deposition device 10 is disclosed and claimed. The claims are not limited to the structure for the material deposition device 10 described or illustrated by way of example or its methods of manufacture or use. The claims are to be considered in view of the existing public knowledge of skilled artisans in the Field prior to the inventions defined by the language of the claims herein or as amended.

Figure 1:
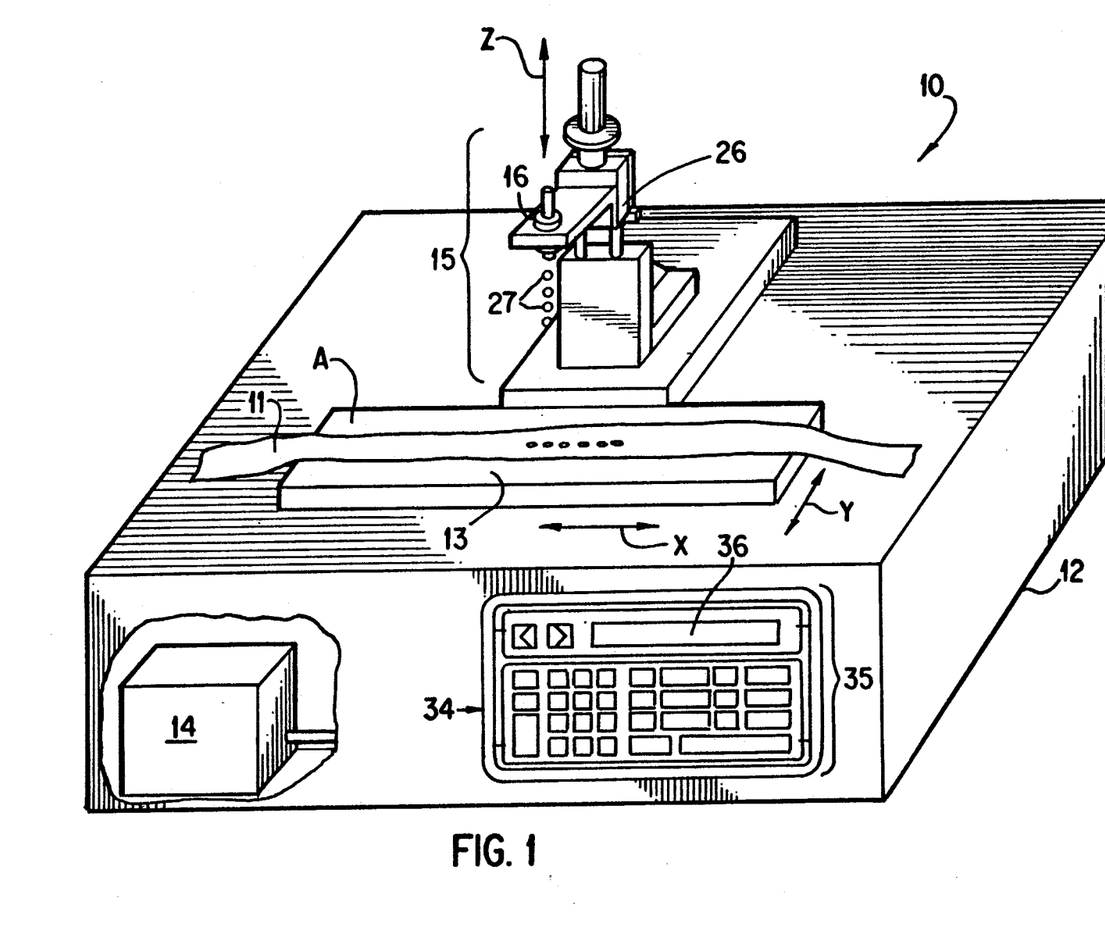
FIG. 1 is a perspective view of the preferred embodiment of a material deposition device as would be seen by its user.

FIG. 1 a perspective view of the preferred embodiment of the material deposition device 10 as would be used to place deposits of material on a substrate 11. A chassis 12 mounts components of the material deposition device 10 relative to a plane "A" on which the substrate is resting in FIG. 1. A conveyer 13 supported on the chassis 12 preferably moves the substrate 11 in the plane "A". Thus, the conveyer 13 can move in directions indicated in FIG. 1 by arrows denoted "X" and "Y" and if desired in the direction of the arrow labeled "Z" also shown therein which is normal to the plane "A". A pressurized supply of material 14 mounted on the chassis 12 provides material to deposit. A deposition means 15 connects to the pressurized supply of material 14 and is carried on the chassis 12 in position for intermittently releasing material to flow onto the substrate 11 moving under the influence of the conveyer 13.

Figure 2:
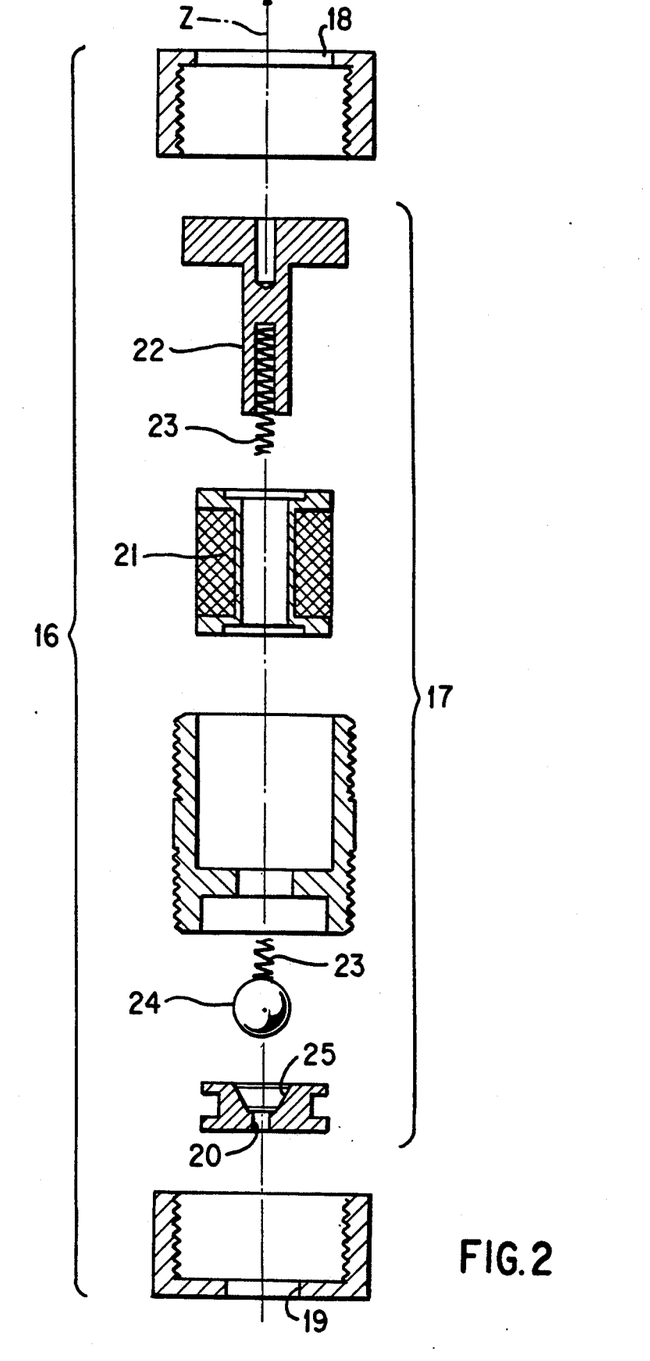
FIG. 2 is an exploded view of the body and valve means in cross section for illustrative purposes.
Figure 3:
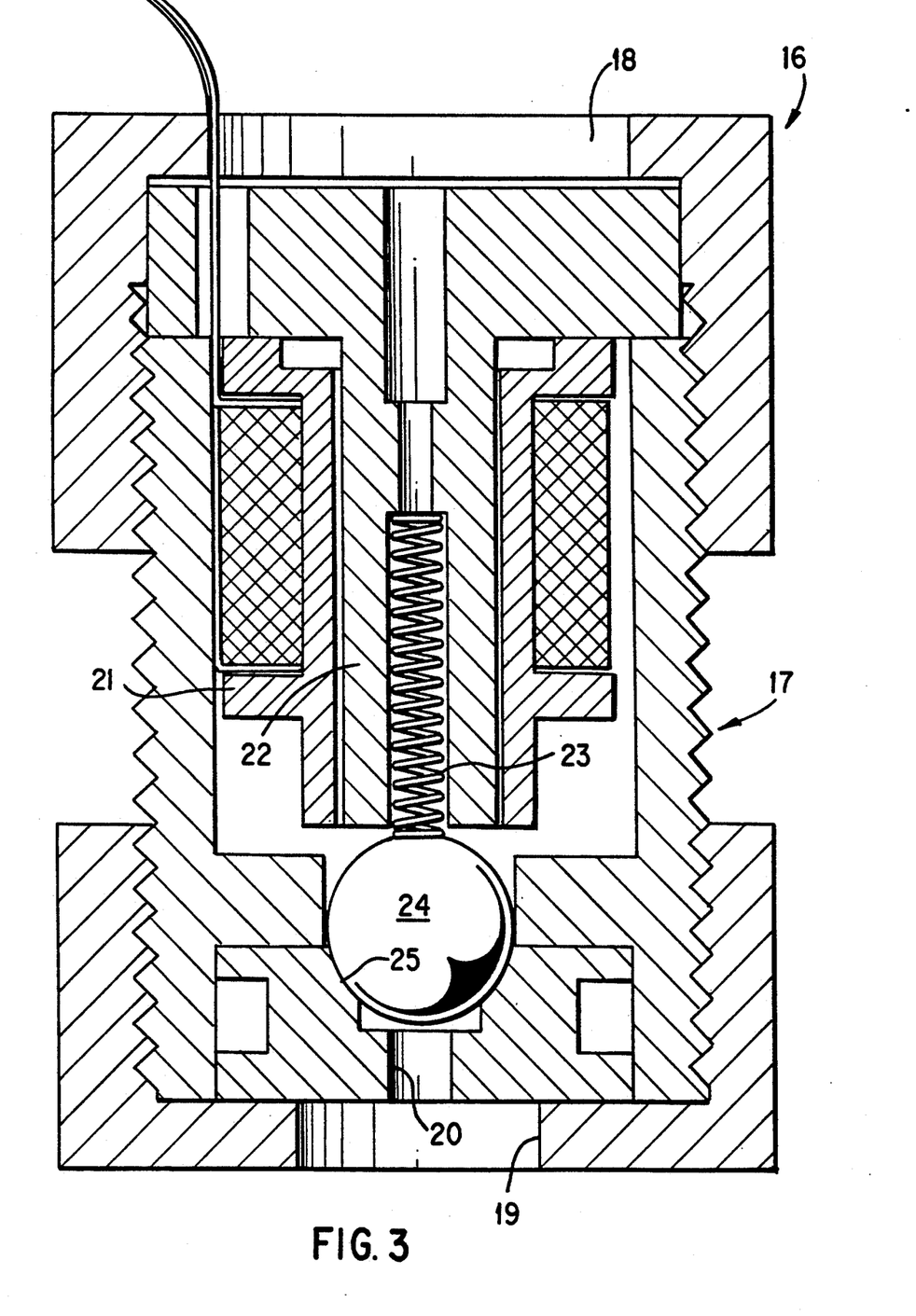
FIG. 3 is a side view in cross section of the assembled body and valve means.

The deposition means 15 has a body 16 connected to the pressurized supply of material 14 for communicating therewith. In FIGS. 2 and 3 a valve means 17 is shown associated with the body 16 selectively releases material from the body 16 for delivery toward the substrate 11. FIG. 2 an exploded view of the body 16 and valve means 17 in cross section for illustrative purposes. The valve means 17 has an inlet 18 and an outlet 19. The inlet 18 communicates with the pressurized supply of material 14 to provide material to the valve means 17 and the outlet 19 may be shaped at nozzle or jet 20 for pressurized patterned delivery of the material toward the substrate 11. The outlet 19 may have an interchangeable orifice mounted thereto for adjusting the size of droplets 27 delivered so a small but significantly reactive dot of material or continuous line formed of overlapping dots of material can be deposited on the substrate 11.

Specifically, the valve means 17 includes a coil of wire 21 with its core 22 reciprocally supported for movement therewithin. A spring 23 is positioned against the core and aligned with the "Z" direction or axis to bear against a ball 24. The ball 24 is thus urged against a seat 25 removably retained in the body 16 by the outlet 19 which is preferrably threaded to the body 16. When electrical current flows through the coil of wire 21 a magnetic field is created which draws the ball 24 which is metal effected by magnetism from its seat 25. The valve means 17 may alternately have a magnetically actuated needle shape (not shown) and whether ball or needle either responds to the circuit 30 means to intermittently deliver droplets 27 from the pressurized supply of material 14 through the outlet 19 to the substrate 11, as illustrated in FIG. 1.

Returning to FIG. 1, a movable support means 26 attached between the chassis 12 and the deposition means 15 locates it with respect to the conveyer 13 permitting relative motion between the deposition means 15 and the conveyer 13 preferrably in the direction indicated by arrow "Z" for positioning the deposition means 15 for deposit of material on the substrate 11. Thus the movable support means 26 can move the deposition means 15 normal relative to the plane "A". The movable support means 26 may also move the deposition means 15 parallel to plane "A" for causing the deposition means 15 to define a locus i.e. in the "Y" direction in the preferred embodiment. Consequently, the movable support means 26 can position the deposition means 15 forming a pattern of droplets 27 relative to the substrate 11. The movable support means 26 moves the deposition means 15 relative to the plane "A" above the conveyer 13 for causing the deposition means 15 to move along the "Z" direction but may also follow the locus and deposit a pattern of droplets 27 which after deposited on the substrate are herein are referred to as dots. It is preferred that the conveyer 13 moves in the "X" direction and the movable support 26 moves primarily in the "Y" direction so that motion in the "Z" direction by the movable support 26 occurs only during set up.

A control 28 connected between the conveyer 13, the movable support means 26 and the valve means 17 has a memory 29 operatively associated therewith for causing them, as a group or individually, to follow the locus. It is preferred that the locus specify the relative motion of the conveyer 13 be in the "X" direction and the movable support 26 move the deposition means 15 in the "Y" and "Z" directions by following the locus and is set within the memory 29 of the control 28. Concurrently, the control 28 also causes the valve means 17 to intermittently draw the ball 24 away from seat 25 to provide delivery of droplets 27 to the substrate 11 thereby varying the positioning of the droplets 27 above and the pattern applied to the substrate 11 and/or the amount or volume of the droplets 27 applied to the substrate 11. The locus, path or pattern of the droplets 27 from the outlet 19 is depicted in FIG. 1 as a line of deposits on the substrate 11.

Figure 4:
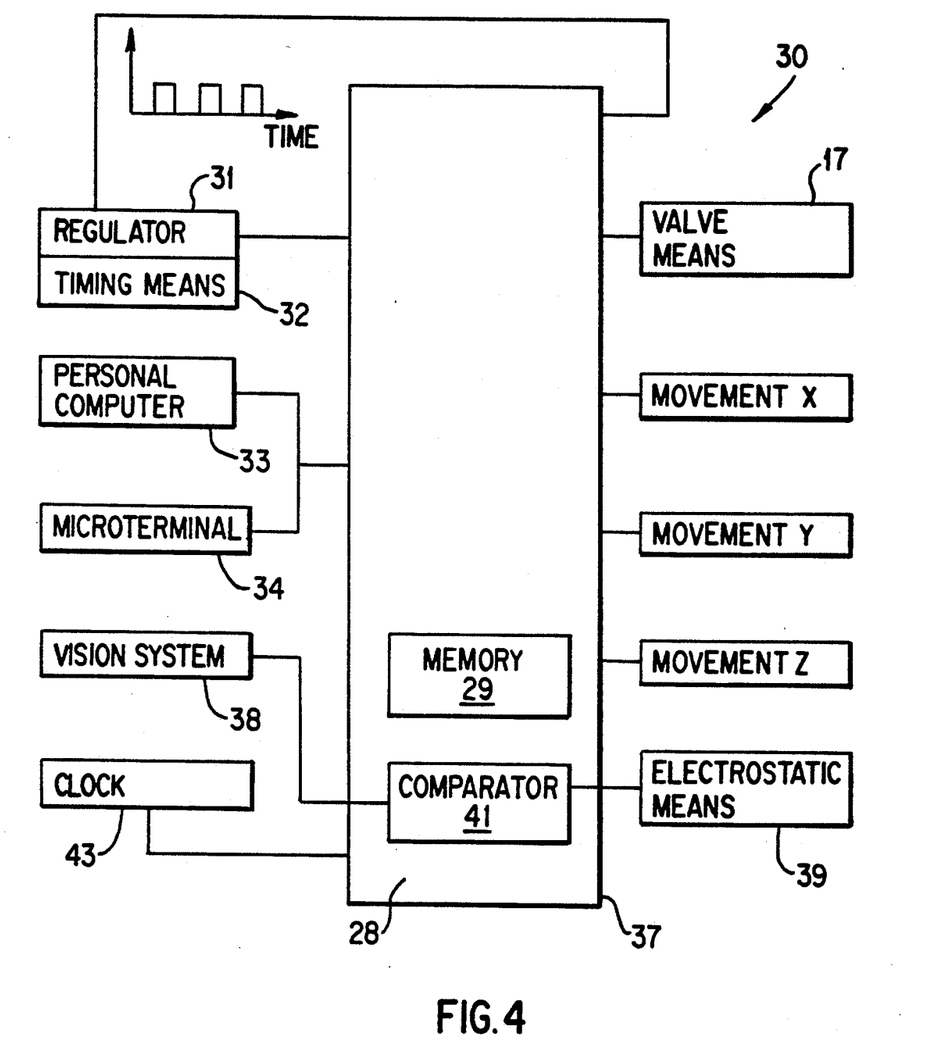
FIG. 4 is block diagram of a circuit for providing varied pulse frequency and/or width, i.e. duration.

FIG. 4 is block diagram of a circuit 30 for providing varied pulse frequency and/or width, i.e. duration. Also in the circuit 30 the control 28 has a regulator 31 for timely activating the valve means 17 to intermittently provide pressurized delivery of droplets 27 to the substrate 11 in a range of one per minute to greater than one thousand per second. The regulator 31 may include a timing means 32 for generating pulses of a preset frequency as programmed in the memory 29 and of a predetermined duration as programmed in the memory 29.

The memory 29 is preferably an array of UV EPROM, static RAM and flash EPROM shown within the block designate memory 29 in FIG. 4.

The flash EPROM represents a reprogrammable, nonvolatile data area wherein application code and data are stored. The control 28 may preferably be in a highly integrated 32 bit microprocessor so the operator interface at a microterminal 34 In FIG. 1 that may be associated with a front panel 35 of the material deposition device 10. Alternatively, the memory 29 can be the personal computer 33 connected for graphic pattern development and downloading. A square wave is shown in FIG. 4 above the block for the regulator 31 represents the pulse width and pulse frequency that are adjustable.

The control 28 operates the valve means 17 to intermittently disperse through the outlet 19 droplets 27 in the range of one per minute to more than one thousand per second. The valve means 17 preferrably has the magnetically operated ball 24 of a mass sufficiently low to permit dispersion in the range. The timing means 32 for generates pulses of preset or varying frequencies and predetermined or varying durations in circuit 30 with the valve means 17 for intermittent delivery of droplets 27 of material to the substrate 11.

In FIG. 4 blocks representing components of the circuit 30 for the material deposition device 10 are shown schematically. A personal computer 33, designated herein "PC," or the microterminal 34 can be attached through a serial communications port to control 28. If the microterminal 34 is used, then a multi key keyboard, shown on a front panel 35 of the chassis 12 as having a 1 or 2 line by 16 character LCD display 36. Eighteen functions can be available on a compact 7" by 4" microterminal; preferably a model PTM 200B by Burr Brown of Tuscon, Ariz. The operations that can be controlled from the keyboard include the starting point within 0.001" or 0.0254 mm; the line/pattern length of the droplets 27 by the pulse width; i.e. droplet size/volume, e.g. 100 picoliters to 1 milliter by the pulse frequency, i.e. droplet per inch, e.g. 10/second to 1500/second. The jet number and sequence when using an array of jets, i.e. nozzles 20 for outlet 19 are also changeable or multiple valve means 17. With a "PC" 33 functions in addition to those for microterminal 34 may include the ability to generate graphic patterns and download data. A clock 43 is shown in FIG. 4 to start and stop the material deposition device 10 and to function as an overall timer.

The control 28 is preferably in the form of a microprocessor 37 and as shown in FIG. 4 output lines connect a microprocessor 37 and act as control links to operate the functions of the conveyer 13, the movable support 26, the valve means 17 and the like which are used to deposit the droplets 27. For example, stepper motors for "X" "Y" and "Z" movement may be included in the functional components of the blocks in FIG. 4. The regulator 31 adjusts the timing of the pulses to vary the amount of material in each individual droplet 27.

Figure 5:
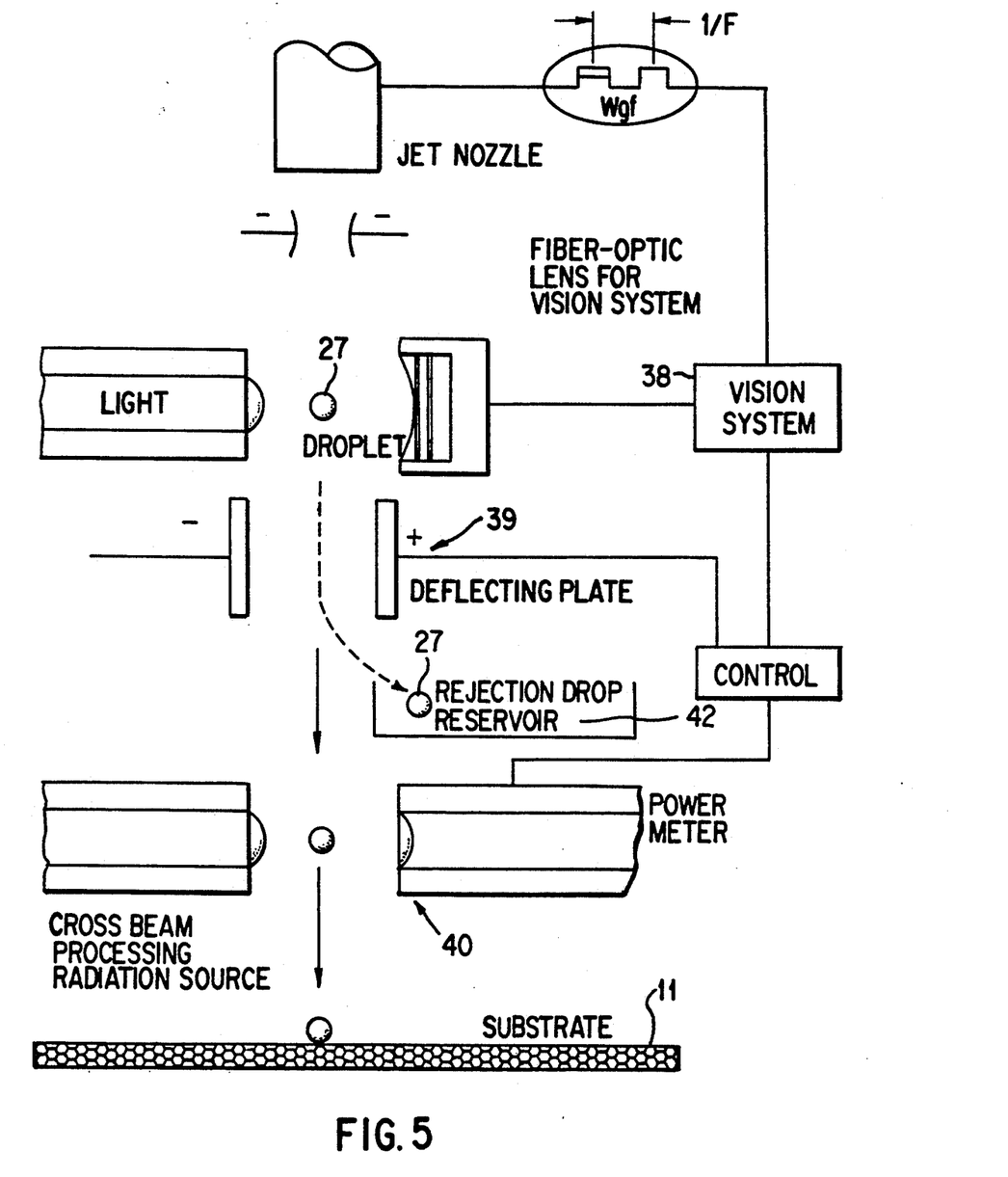
FIG. 5 is a schematic illustration of the vision system used to specifically monitor the quality including timing and size of the droplets, the electrostatic droplet deflection arrangement and the radiation processing station for irradiation application to the droplet.

FIG. 5 is a schematic illustration of a vision system 38 used to specifically monitor the quality including timing and size of the droplets, an electrostatic means 39 for deflection of droplet 27 and a radiation processing station 40 for irradiation application to the droplets 27. The electrostatic means 39 may establish a fixed or varying force field to reposition droplets 27 delivered from the valve means 17 toward the substrate 11. The patterned delivery from the intermittent operation of the valve means 17, may also be influenced by the pressure upon and characteristics of the material. Other factors influencing delivery are the shape of outlet 19, nozzle or jet 20 and the pulse timing of regulator 31.

Vision system 38 responds to the generated pulses and is located on the chassis 12 in position to examine individual droplets 27 from the outlet 19 passing by the vision system 38 on their way to the substrate 11. The vision system 38 shown in FIG. 5 is used for monitoring the quality of droplets 27 including timing, location on substrate 11 or size and for providing a signal relative thereto. The vision system 38 provides a signal relative to its examination of each droplet 27. A feedback loop 37, as part of circuit 30 in FIG. 4, is provided between the vision system 38 and the electrostatic means 39 includes a comparator 41 in the microprocessor 37 to vary individual pulses generated thereby for correcting the pulse width in accord with a signal of the compared difference detected by the vision system 38 and an established datum in the memory 29. In addition feedback from that part of the control 28 can preferably be used to vary droplet 27 placement of on substrate 11 by varying motion of the conveyer 13 or the deflection of the electrostatic means 36 in accord with the memory 29 or changing instructions provided through the micro terminal 34 or the PC 33.

The electrostatic means is preferably positioned on the chassis 12 down stream of the vision system 38 and oriented to submit rejected droplets 27 to a return reservoir 42 which can be connected to the pressurized supply of material 14 to thereby recycle the material of droplets 27 lacking quality. The radiation processing station 35 is shown in FIG. 5 in a preferred mounting on the chassis 12, i.e. after the electrostatic means 39. The radiation processing station 40 is arranged to irradiate droplets 27 not deflected thereby applying radiant energy thereto and before deposition on the substrate 11.

The broad scope of the claimed material deposition device 10 includes use by varying the pulse frequency and/or width to control accurately and precisely the amount and/or position of the material deposited. The band width of pulse modulation allows changes at the pulse level so variation of pulses maybe as frequently as each pulse, if needed. While it is preferred that the material deposition device 10 be used with bioreagents, chemicals or the like; oils, adhesives, coatings and other matter not specifically mentioned are also included herein as appropriate material for deposition.

What is claimed is:

1. A material deposition device to intermittently place patterned deposits of material on a substrate comprising:
   a chassis to mount components of the material deposition device relative to a plane thereof;
   a conveyor supported on the chassis, the conveyer located for moving the substrate substantially in the plane;
   a deposition means carried on the chassis in position for intermittently releasing material to flow onto the substrate moving under the influence of the conveyer;
   a movable support means attached between the chassis and the deposition means for locating it with respect to the conveyer, the movable support means permitting relative motion between the deposition means and the conveyer for positioning the deposition means and the substrate for deposit of material on the substrate;
   a supply of material connected to the deposition means for providing material to the deposition means for deposit;
   a control having a memory operatively connected for intermittently causing relative motion between the conveyer and the movable support means to vary the position of the deposition means relative to the substrate, the control including a regulator for timely activating the deposition means, and
   a valve means as part of the deposition means and responsive to the regulator for selectively and intermittently releasing and discharging material from the valve means for delivery toward the substrate of an individual droplet of an amount defined as to size or volume by the valve means movement as controlled by the regulator.

2. The material deposition device of claim 1 wherein the movable support means moves the deposition means causing it to define a locus set within the memory of the control, the locus specifying the relative position of the conveyer and the deposition means.

3. The material deposition device of claim 2 wherein the movable support means moves the deposition means and the conveyer or either of them forming a pattern relative to the substrate.

4. The material deposition device of claim 1 wherein the deposition means includes a body connected to the supply of material for communicating therewith and the valve means associated with the body and responsive to the control for selectively releasing material from the valve means for delivery toward the substrate.

5. The material deposition device of claim 4 wherein the body has an inlet and an outlet, the inlet communicating with the supply of material to provide material to the valve means and the outlet shaped for patterned delivery of the material toward the substrate.

6. The material deposition device of claim 5 wherein the control causes the valve means to intermittently provide delivery of the selectively released material from the valve means for delivery toward the substrate as droplets to the substrate thereby varying the positioning of the droplets above and the pattern applied to the substrate and the amount or volume of the droplets applied to the substrate.

7. The material deposition device of claim 6 wherein the control and the valve means intermittently disperse through the outlet droplets in the range of one per minute to more than one thousand per second, the valve means having a magnetically operated ball having mass sufficiently to permit movement of the ball at a rate to provide dispersion in the range.

8. The material deposition device of claim 1 wherein the regulator for timely activating the deposition means for intermittently releasing material to flow onto the substrate in accord with timing pulses provided by the regulator, the regulator adjusts the timing of the pulses for varying the amount of material in each individual droplet.

9. The material deposition device of claim 1 wherein the movable support means moves the deposition means relative to the plane for causing the deposition means to define a locus set within the memory of the control, the locus specifying the relative motion of the conveyer and the deposition means for delivery of a pattern of droplets or move either the conveyer or the deposition means.

10. The material deposition device of claim 9 wherein the deposition means includes a body connected to the supply of material for communication therewith and a valve means contained within the body responsive to the control for delivering material from the body toward the substrate, and an electrostatic means on the chassis between the body and the conveyer establishes a fixed or varying force field to reposition the material delivered from the body toward the substrate.

11. The material deposition device of claim 10 wherein the body has an inlet and an outlet, the inlet communicating with the supply of material for providing material under pressure to the valve means and the outlet shaped for patterned delivery of the material subject to the influence of the force field of the electrostatic means.

12. The material deposition device of claim 11 wherein the regulator includes timing means for generating pulses of a preset frequency and predetermined duration, the timing means connected in a circuit with the valve means for intermittent delivery of droplets of material at a frequency in the range of one per minute to more than one thousand per second, the valve means magnetically actuated by the circuit means to intermittently deliver droplets from the supply of material through the outlet toward the substrate.

13. The material deposition device of claim 11 wherein the regulator includes a timing means for generating pulses of a width and at a frequency and the outlet is interchangeable for adjusting the size of droplets delivered to create a small dot of material or a continuous line formed of overlapping dots of material deposited on the substrate, the dots although small are reactive to signify their existence.

14. The material deposition device of claim 13 wherein a vision system is responsive to the generated pulses, the vision system located on the chassis in position to examine individual droplets from the outlet passing by the vision system for monitoring droplet timing, droplet location on the substrate or droplet size and for providing a signal relative thereto.

15. The material deposition device of claim 14 wherein a feedback loop is provided between the vision system and the control to transmit the signal and to vary individual pulses generated thereby for correcting the individual pulse width or frequency in accord with the difference between the signal and an established datum in the memory, to vary droplet placement on substrate by varying motion of the conveyer or the deflection of the electrostatic means.

16. The material deposition device of claim 14 wherein the electrostatic means is positioned on the chassis downstream of the vision system, the electrostatic means is oriented to submit rejected droplets to a return connected to the supply of material to thereby recycle droplets lacking quality.

17. The material deposition device of claim 16 wherein a radiation processing station mounted to the chassis and arranged to irradiate droplets not deflected for application of radiant energy thereto and before deposition on the substrate.

18. A material deposition device to place deposits of material on a substrate comprising:

a chassis to mount components of the material deposition device relative to a plane;

a conveyer supported on the chassis, the conveyer for moving the substrate in the plane;

a pressurized supply of material on the chassis for providing material to deposit;

a deposition means connected to the pressurized supply of material and carried on the chassis in position for intermittently releasing material to flow onto the substrate moving under the influence of the conveyer, the deposition means including a body connected to the pressurized supply of material for communicating therewith;

a valve means associated with the body for selectively and intermittently releasing and discharging material from the valve means for delivery toward the substrate of an individual droplet of an amount defined as to size or volume by the valve means movement as controlled by a regulator, the valve means as part of the deposition means and having an inlet and an outlet, the inlet communicating with the pressurized supply of material to provide material to the valve means and the outlet shaped for pressurized patterned delivery of the material toward the substrate;

a movable support means attached between the chassis and the deposition means for locating it with respect to the conveyer, the movable support means permitting relative motion of the deposition means and the conveyer for positioning the deposition means for deposit of material on the substrate, the movable support means for movement of the deposition means relative to the plane, and a control including a regulator and connected between the conveyer, the movable support and the valve means, the control having a memory operatively connected between the movably support and the deposition means to cause it to define a locus specifying the relative motion between the conveyer, the locus set within the memory of the control, the control having a regulator for timely activating the deposition means to cause the valve means to intermittently provide pressurized delivery of droplets to the substrate in the range of one per minute to one thousand per second, the valve means having a magnetically operated ball having mass sufficiently low to permit dispersion in the range.

19. The material deposition device of claim 18 wherein the movable support means moves the deposition means relative to the plane above the conveyer for causing the deposition means to follow the locus and deposit a pattern of droplets.

20. The material deposition device of claim 19 wherein an electrostatic means establishes a fixed or varying force field to reposition the material delivered.

21. The material deposition device of claim 20 wherein patterned delivery results from the valve means, the pressure and the material under the influence of the force field of the electrostatic means, the amount or volume of material delivered is controlled by the outlet shape and the regulator.

22. The material deposition device of claim 21 wherein the outlet has an interchangeable orifice mounted thereto for adjusting the size of droplets delivered so a small but significantly reactive dot of material or continuous line formed of overlapping dots of material can be deposited on the substrate.

23. The material deposition device of claim 21 wherein the regulator includes a timing means for generating pulses of a preset frequency as programmed in the memory and of a predetermined duration as programmed in the memory, the outlet having an interchangeable orifice mounted thereto for adjusting the size of droplets delivered so a small dot of material or continuous line formed of overlapping dots of material can be deposited on the substrate, the dots although small are reactive to signify their existence.

24. The material deposition device of claim 23 wherein a vision system is responsive to the generated pulses, the vision system located on the chassis in position to examine individual droplets from the outlet passing by the vision system for monitoring the droplet quality including timing and size of droplets formed and for providing a signal relative thereto.

25. The material deposition device of claim 24 wherein a feedback loop is provided between the vision system and the control to vary individual pulses generated thereby for correcting the pulse width in accord with the difference between the signal and an established datum in the memory.

26. The material deposition device of claim 24 wherein the electrostatic means is positioned on the chassis down stream of the vision system, the electrostatic means oriented to submit rejected droplets to a return connected to the pressurized supply of material to thereby recycle droplets lacking quality.

27. The material deposition device of claim 26 wherein a radiation processing station mounted to the chassis and arranged to irradiate droplets not deflected for application of radiant energy thereto and before deposition on the substrate.

* * * * *